UNITED STATES PATENT OFFICE.

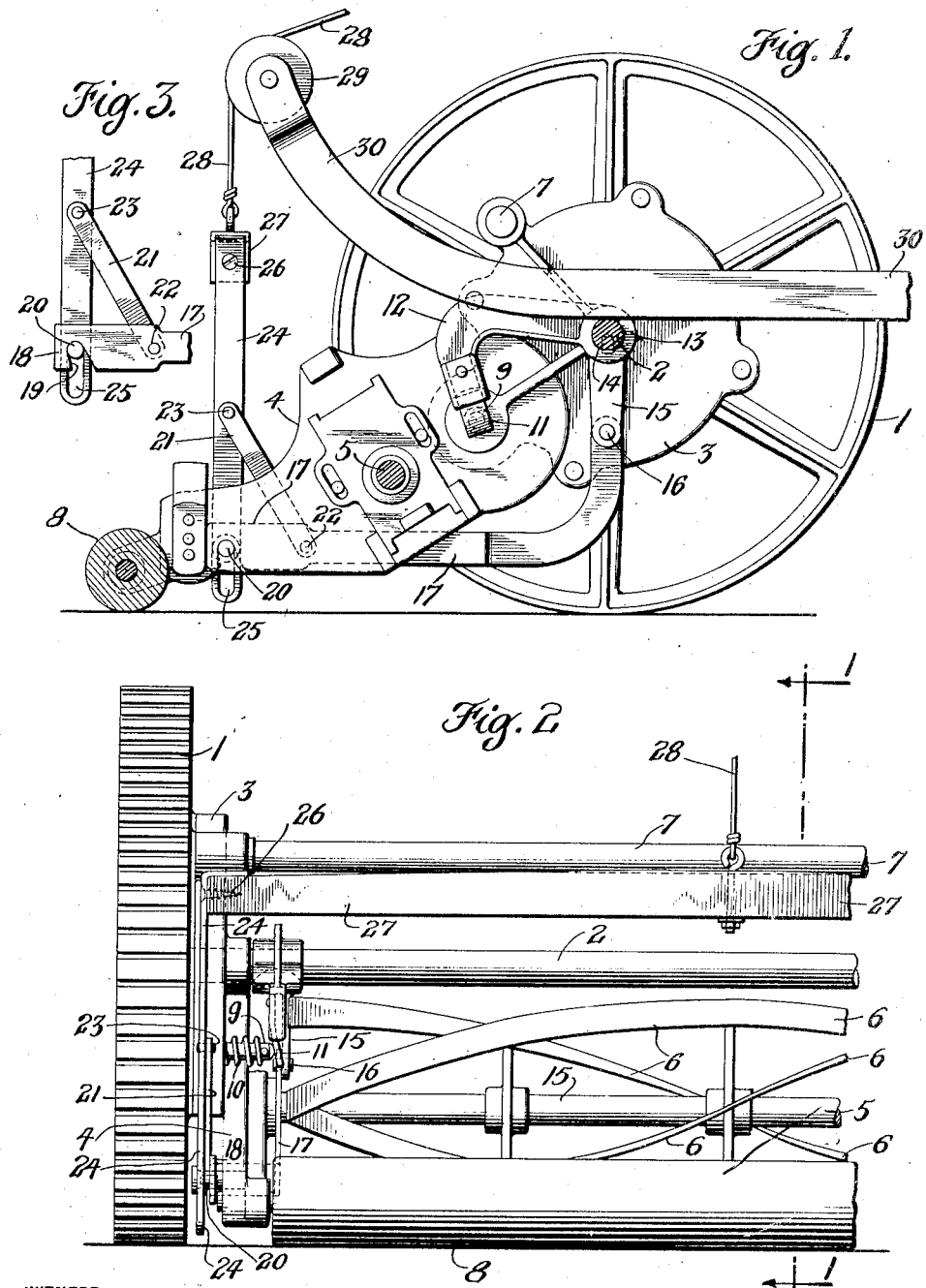

WILLIAM P. M. BRAUN, OF PHILADELPHIA, PENNSYLVANIA, ASSIGNOR TO PENNSYLVANIA LAWN MOWER WORKS, OF PHILADELPHIA, PENNSYLVANIA, A CORPORATION OF PENNSYLVANIA.

LAWN-MOWER STRUCTURE.

1,338,285.   Specification of Letters Patent.   Patented Apr. 27, 1920.

Application filed June 17, 1919. Serial No. 304,850.

*To all whom it may concern:*

Be it known that I, WILLIAM P. M. BRAUN, a citizen of the United States, residing in the city and county of Philadelphia, State of Pennsylvania, have invented certain new and useful Improvements in Lawn-Mower Structures, of which the following is a specification.

My invention relates to lawn mowers and particularly to lawn mower structure utilizable in gang lawn mowers.

In one of its aspects my invention resides in improvements upon structure disclosed in Letters Patent of the United States No. 1,295,108, granted me February 25, 1919.

It is the object of my invention to provide means for preventing the cutter mechanism from rising or jumping from the ground, for releasing the cutter mechanism from restraint in these respects, and for lifting the same from the ground.

To these ends I provide simple structure comprising a hook-like locking member, preferably capable of pivotal movement in a plane normal to the ground, adapted to engage with a pin or the like carried by the side frame or gear case to prevent the latter from partaking of pivotal movement away from the ground; and I provide further means for lifting the side frame to cause it to partake of pivotal movement and rise from the ground, such means comprising preferably a slotted member coacting with the aforesaid pin to raise the side frame after predetermined movement of the slotted member, initial movement of said member being communicated to the hook member to first unlock or release the side frame.

My invention resides in structure of the character hereinafter described and claimed.

For an illustration of one of the various forms my invention may take, reference is to be had to the accompanying drawing, in which:

Figure 1 is a side elevational view, partly in section on the line 1—1 of Fig. 2, of lawn mower structure embodying my invention.

Fig. 2 is a fragmentary rear elevational view of structure shown in Fig. 1.

Fig. 3 is a fragmentary view illustrating parts embodied in my invention.

Referring to the drawing, 1 represents a ground engaging wheel having a rotatable bearing upon the shaft or axle 2 which may be fixed or held against rotation, as when the lawn mower unit is employed in a gang mower, as for example, described in said Letters Patent. The ground wheel 1 drives suitable gearing, as well understood in the art, which is contained in the gear case 3 having a rearward extension constituting a side frame 4, in which is journaled the shaft 5, driven by the aforesaid gearing and driving the rotary cutter mechanism comprising rotary cutter blades 6. A transversely extending tie rod 7 may be employed, the same being secured at its ends to the gear casings 3, one of which is at each side of the lawn mower mechanism, as well understood in the art. At the rear of the side frame 4 is pivoted the ground engaging roller 8 which rolls upon the ground back of the cutter mechanism, and in usual manner holds the cutter mechanism a suitable distance from the ground.

In the gear train between the wheel 1 and shaft 5 may be a disengageable clutch, such, for example, as described in the aforesaid Letters Patent, which clutch may be actuated by the pin 9, held in position indicated in Fig. 2 by the spring 10. The pin 9 may be actuated by the cam member 11 carried at the end of a crank arm 12 integral with the hub 13 suitably secured, as by key 14, upon the aforesaid shaft or axle 2. Integral with or secured to the hub 13 is a downwardly extending crank arm 15 to which there is pivoted at 16 the downwardly and rearwardly extending hook member or lever 17 terminating at its rear end in the hook 18 having any suitable slot, as 19, in which is engaged the pin 20 or equivalent projection secured to or carried by the side frame 4. The side frame is capable of pivotal motion about the center of the axle 2, but when the hook 18 engages the pin 20 such pivotal movement cannot take place, because of the locking effect by the bar 17. In consequence the cutter mechanism is held in predetermined position and cannot rise or jump from the ground as the lawn mower, particularly when a part of a gang lawn mower, is moved over the ground in the act of cutting grass.

However, it is desirable, particularly in gang lawn mowers, sometimes to raise the cutter mechanism from the ground by raising the rear end of the side frame and causing said frame structure to partake of pivotal movement about the axis of the ground engaging wheel 1. To this end it is first necessary to unlock the side frame, by disengaging the hook lever 17 from the pin 20. For this purpose I provide any suitable means, as for example, a link 21 pivoted at 22 to the lever arm 17 and at 23 to the lifting bar or member 24 having at its lower end the elongated slot 25 embracing the aforesaid pin 20. At its upper end the bar 24 is connected as by screw 26 to the transversely extending beam or bar 27 which may be of wood or any other suitable material. Attached to the beam 27 is any suitable lifting means, as a cord or chain 28, which may pass over a roller 29 carried by the member 30 comprising part of or suitably attached to the framework, as of a gang lawn mower, the cord 28 being actuated by any mechanism, such as a hand operated lever adjacent the seat of the operator on a gang lawn mower.

The operation is as follows:

As the ground wheel 1 rolls upon the ground, to the right as viewed in Fig. 1, it drives the rotary cutter mechanism, while the roller 8 trails behind upon the ground. The side frame, and therefore the cutter mechanism, is prevented from rising upwardly by the locking member 17, any tendency on the part of said frame to move with respect to the ground being opposed by a pressure of the locking member 17 upon the pivot 16, which, however, is in fixed relation with respect to the axle 2 about whose center the side frame is pivoted.

If, however, it should be desired to raise the side frame from the ground, an upward pull upon the cord or chain 28 raises the beam 27, which in turn raises the bar 24, which pulls upwardly upon the link 21, which in turn pulls upwardly upon the locking lever 17, rotating it in clockwise direction, as viewed in Fig. 1, on its pivot 16, removing the hook 18 free from the pin 20, the lower end of the bar 20 in the meantime being guided upwardly by the pin 20 within the slot 25. After the locking member has been removed from engagement with the pin 20, the lower end of the slot 25 engages the under side of the pin 20 and thereafter the pin 20 accompanies the bar 24 upwardly, so raising the side frame and cutter mechanism away from the ground by pivotal movement of the side frame and cutter mechanism about the axis of the shaft or axle 2 as a center.

Later lowering the bar 24 lets the side frame down until the roller 8 engages the ground and shortly thereafter the hook 18 reëngages the pin 20 to lock the side frame against movement.

In the aforesaid upward movement of the side frame the pin 9 moves into engagement with the cam 11, causing the pin to move inwardly and so interrupt the train of gearing, as described in the aforesaid patent, whereby when the side frame is lifted the cutter mechanism is no longer rotated even though the ground wheel 1 continues to roll upon the ground.

While the above described locking and lifting mechanism is shown at one end only of the lawn mower structure, it will be understood that it may be and preferably is duplicated at the right end of the lawn mower structure, only the middle and left end of which are shown in Fig. 2.

What I claim is:

1. Lawn mower structure comprising a ground engaging wheel, cutter mechanism driven thereby, a support for said cutter mechanism, means for restraining said support against movement with respect to the ground, means for lifting said support from the ground, a lost motion connection between said support and said lifting means, and a member connecting said lifting means with said restraining means.

2. Lawn mower structure comprising a ground engaging wheel, cutter mechanism driven thereby, a pivoted support for said cutter mechanism, means restraining said support against pivotal movement, means for lifting said support, a lost motion connection between said lifting means and said support, and a link connected to said restraining means and to said lifting means.

3. Lawn mower structure comprising a ground engaging wheel, cutter mechanism driven thereby, a support for said cutter mechanism, a pin carried by said support, a locking member engaging said pin to prevent movement of said support, a lifting member having a lost motion connection with said pin, and a link pivoted to said lifting member and to said locking member, whereby said locking member is first disengaged from said pin and thereafter said lifting member engages said pin to move said support.

4. Lawn mower structure comprising an axle, a ground engaging wheel, rotary cutter mechanism driven by said wheel, a support for said cutter mechanism pivoted on said axle, a pin on said support, an arm secured to said axle, a locking lever pivoted to said arm and engaging said pin, a lifting bar having a slot embracing said pin, and a link pivoted to said lifting member and said locking lever.

5. Lawn mower structure comprising an axle, a ground engaging wheel, rotary cutter mechanism driven by said wheel, a support for said cutter mechanism pivoted on said axle, a locking member detachably securing said support to said axle to prevent pivotal movement of said cutter mechanism with respect thereto, a lifting member having lost motion with respect to said support, and a connection between said locking member and said lifting member, whereby said locking member is actuated to release said support before said lifting member moves said support.

6. Lawn mower structure comprising an axle held against rotation, a ground engaging wheel rotatable on said axle, rotary cutter mechanism driven by said wheel, a support for said cutter mechanism pivoted on said axle, an arm secured to said axle, a hook lever pivoted to said arm, a pin on said support engaged by said hook lever to prevent pivotal movement of said support, a lifting bar having a slot embracing said pin, and a link pivoted to said lifting bar and to said hook lever, whereby movement of said lifting bar first detaches said hook lever from said pin and thereafter moves said support about said axle.

7. Lawn mower structure comprising a ground engaging wheel, a pivoted side frame, rotary cutter mechanism carried by said side frame and driven by said wheel, a locking member engaging said side frame, a member for lifting said side frame, and a connection between said lifting member and said locking member for disengaging said locking member before said lifting member moves said side frame.

8. Lawn mower structure comprising a ground engaging wheel, cutter mechanism driven thereby, a support for said cutter mechanism movable in a vertical plane, a pin carried by said support, a locking member having pivotal movement in a vertical plane engaging said pin to prevent movement of said support, a lifting member having a lost motion connection with said pin, and a link pivoted to said lifting member and to said locking member, whereby said locking member is first disengaged from said pin and thereafter said lifting member engages said pin to move said support.

9. Lawn mower structure comprising an axle held against rotation, cutter mechanism, a support for said cutter mechanism pivoted on said axle, a projection in fixed position on said support, and means on said axle for engaging said projection for holding said support against rotary motion with respect to said axle.

In testimony whereof I have hereunto affixed my signature this 16th day of June, 1919.

WILLIAM P. M. BRAUN.